(No Model.) 3 Sheets—Sheet 3.

S. B. GILLILAND & W. R. P. JACKSON.
HAY LOADER.

No. 565,738. Patented Aug. 11, 1896.

Witnesses
Jas. K. McCathran

Inventor
Samuel B. Gilliland
William R. P. Jackson
By their Attorneys,
C. A. Snow & Co.

UNITED STATES PATENT OFFICE.

SAMUEL B. GILLILAND AND WILLIAM R. P. JACKSON, OF MONROE CITY, MISSOURI.

HAY-LOADER.

SPECIFICATION forming part of Letters Patent No. 565,738, dated August 11, 1896.

Application filed December 23, 1895. Serial No. 573,071. (No model.)

*To all whom it may concern:*

Be it known that we, SAMUEL B. GILLILAND and WILLIAM R. P. JACKSON, citizens of the United States, residing at Monroe City, in the county of Monroe and State of Missouri, have invented a new and useful Hay-Loader, of which the following is a specification.

This invention relates to hay-loaders; and it has for its object to provide a new and useful construction of hay-loader that can be readily attached to and detached from a hay-wagon, while at the same time having new and improved means for raking up and delivering the hay into the wagon, and in the attainment of this result the invention contemplates entirely dispensing with the ordinary drag or sulky rake with which most hay-loaders are equipped.

With these and other objects in view, which will readily appear as the nature of the invention is better understood, the same consists in the novel construction, combination, and arrangement of parts hereinafter more fully described, illustrated, and claimed.

Figure 1:
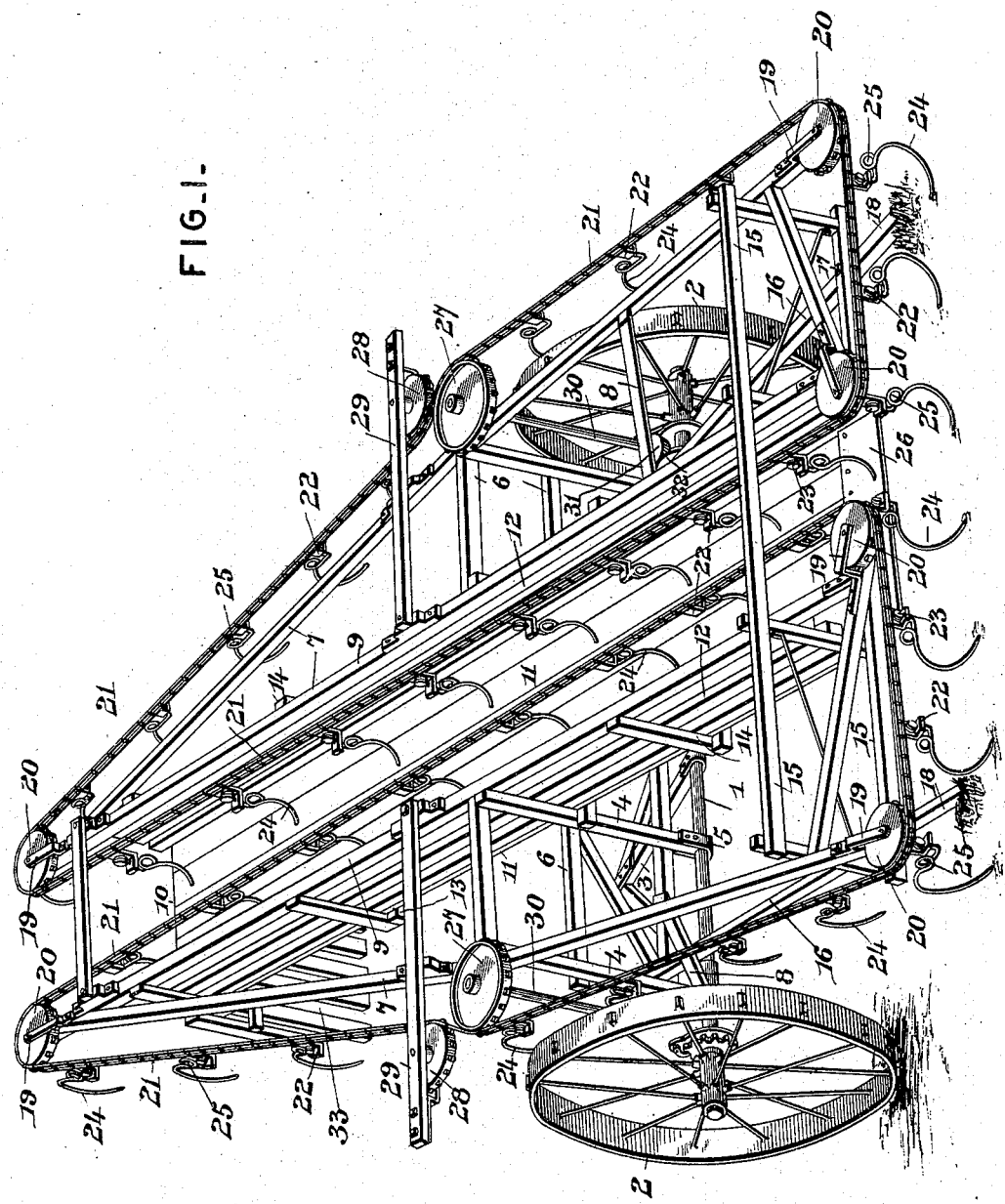
Figure 2:
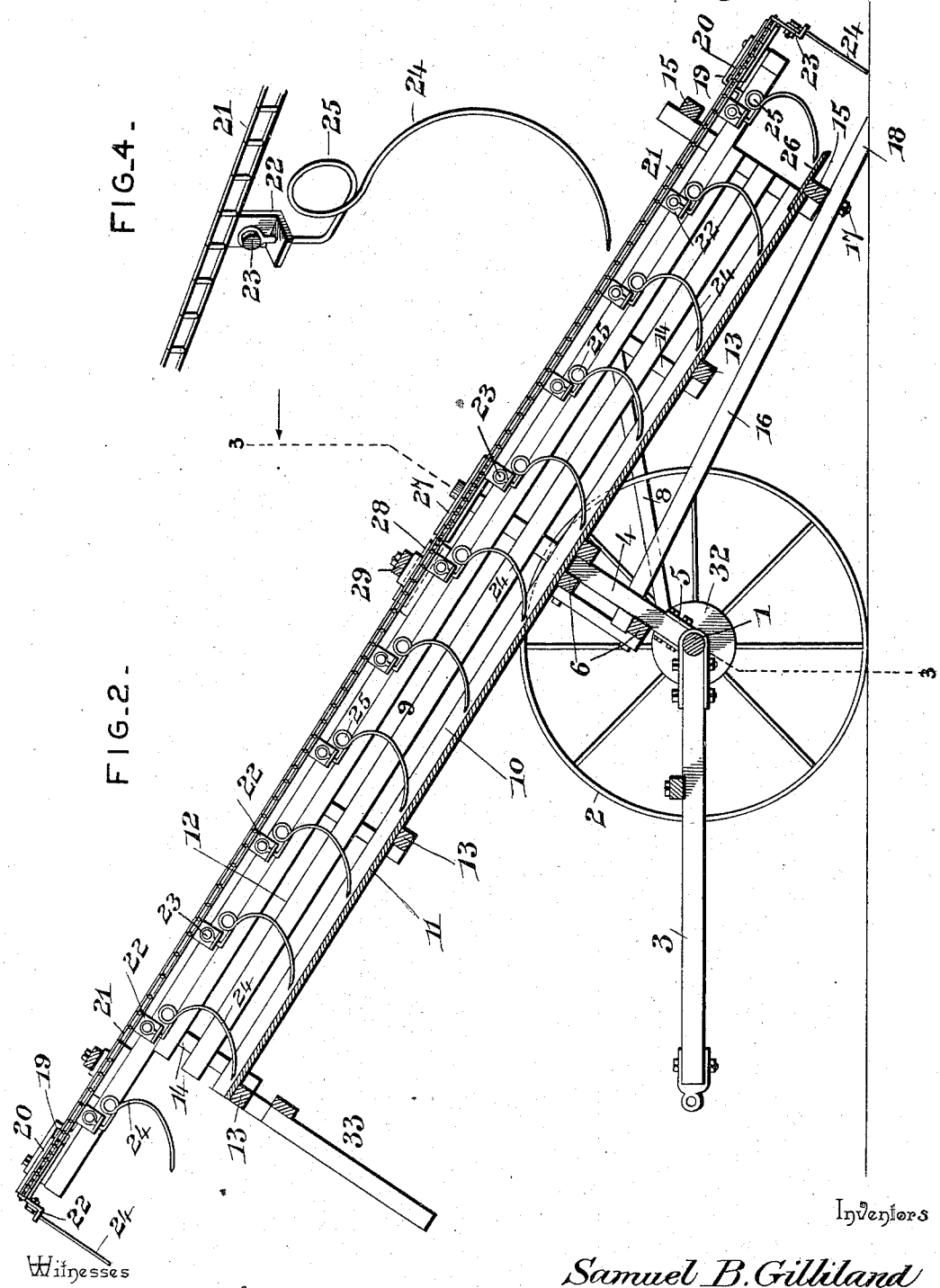
Figure 3:
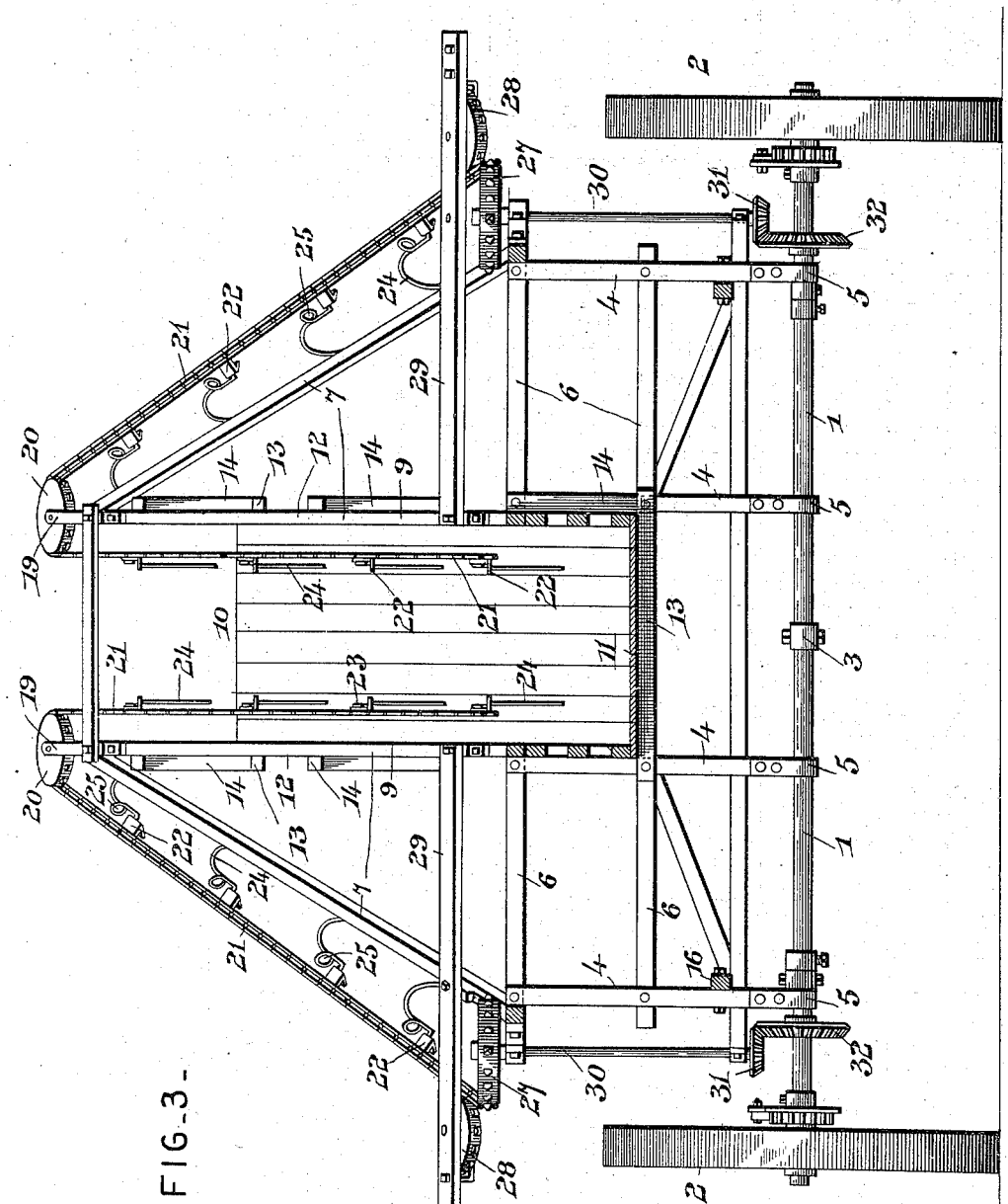

In the drawings, Figure 1 is a perspective view of a hay-loader constructed in accordance with this invention. Fig. 2 is a central vertical longitudinal sectional view thereof. Fig. 3 is a transverse sectional view on the line 3 3 of Fig. 2. Fig. 4 is a detail in perspective of a section of one of the combined rake and elevating chains.

Referring to the accompanying drawings, the numeral 1 designates the main axle of the machine, carrying on its opposite ends the ground-wheels 2, which are suitably connected with the axle to provide for the rotation thereof, in order to impart motion to the raking and elevating devices of the machine, as will be hereinafter more fully pointed out. The axle 1 has pivotally connected thereto a short fowardly-extending tongue-frame 3, which is adapted to be suitably connected to the rear end of an ordinary hay-wagon, which provides means for dragging the hay-loader over the ground to insure an automatic raking up of the hay from the ground and the delivery thereof into the wagon.

The wheeled axle 1 supports thereon a series of frame standards or uprights provided at their lower ends with the bearing-clips 5, which loosely receive the axle 1, and said standards or uprights are firmly braced and connected together by transverse frame-bars 6, arranged parallel with the axle and bolted or otherwise suitably secured to the several standards or uprights 4. The frame standards or uprights 4 support at their upper ends the opposite triangularly-shaped frames 7, which are rigidly braced in rear of the standards 4 by means of short inclined braces 8. The inner adjacent sides 9 of the opposite triangularly-shaped frames 7 are arranged parallel, so as to inclose therebetween a central inclined elevator-chute 10. The central inclined elevator-chute 10 extends the entire length of the frame 7, between the same, and essentially comprises a flat imperforate bottom 11 and opposite slatted sides 12, partly formed by the inner parallel sides of the opposite triangular frames 7, and the said elevator-chute is braced at suitable points by transverse cleats 13, extending transversely under the imperforate bottom 11, and short side posts 14, secured at their lower ends to the opposite extremities of the cleats 13 and arranged on the outer sides of the slatted sides 12 of the said elevator-chute.

The lower ends of the opposite triangular frames 7 and the central elevator-chute 10 have fitted thereto a lower rectangular end frame 15, which braces and strengthens the lower part of the structure which travels over the ground, and secured to the lower side bar of the frame 15, near its opposite ends, are the opposite slide-bars 16.

The slide-bars 16 are bolted, as at 17, to the lower side bar of the frame 15 and are also bolted at their inner ends at the inner side of the inclined braces 8 and the standards 4, adjacent to such braces, and the outer ends of the slide-bars 16 are projected in rear of the frame 15 to form beveled feet 18, which rest and slide on the ground to provide for maintaining the frame 7 and the chute 10 at the proper inclination, and also providing means for maintaining the rake-teeth of the loader at a proper relative distance from the ground.

The opposite triangular frames 7 have mounted on each of their three corners bearing-brackets 19, in which are journaled sprocket-wheels 20, over which pass the endless combined rake and elevating chains 21. By reason of the triangular shape of the frames 7 and the location of the sprocket-wheels 20 at the corners of such frames the opposite endless chains 21 necessarily conform to the contour of the frame 7, so as to be arranged in a triangle. The triangular arrangement of the endless combined rake and elevating chains 21 disposes the inner adjacent parallel sides of said chain within the central elevator-chute 10, while the outer hypotenuse portions of the chains are disposed at the extreme outer sides of the frames 7, thereby leaving short side portions at the lower ends of the frames 7, which form the raking portions of the chain. At regularly-spaced intervals certain links of the endless chains 21 are provided with short depending flanged attaching-plates 22, to which are suitably bolted at 23 the upper ends of the curved spring rake-teeth 24. The curved spring rake-teeth 24 are provided adjacent to their connection with the chains with the spring-coils 25, which greatly contribute to the spring action of the teeth to allow the same to readily spring over obstructions and also the end plate 26, secured to the lower end of the imperforate bottom of the central elevator-chute.

At an intermediate point the outer hypotenuse portions of the triangularly-arranged chains 21 are engaged by the drive sprocket-wheels 27, and the chains are held in positive engagement with the wheels 27 by means of the idler sprocket-wheels 28, mounted on the under sides and outer ends of the laterally-projected supporting-arms 29, fastened on top of the frames 7 above the wheels 27. The drive sprocket-wheels 27 are fitted on the upper extremities of the upright drive-shafts 30, journaled in suitable bearings at one side of the frames 7 and one of the supporting-standards 4 therefor, and carrying at their lower ends the beveled gear-pinions 31, meshing with the beveled gear-wheels 32, fitted on the axle 1, and providing means for transmitting motion to the chains 21.

The central elevator-chute 10 has suitably fitted to its extreme upper end the downwardly-inclined slatted deflecting-apron 33, which overhangs the hay-wagon in the usual manner and provides for the deflection of the hay into the wagon as it is delivered out of the upper end of the chute by the rake-teeth carried by the inner parallel portions of the opposite chains traveling through the said chute.

It will be apparent that the arrangement of the chains 21 in triangles provides means whereby the portions of the endless chains passing between the sprocket-wheels at the lower ends of the frames 7 will form the raking portions of the chains and will carry the rake-teeth in a direction toward the central chute 10, whereby each rake-tooth will gather hay from the ouside and carry it toward the center of the machine. Each rake-tooth gathers its own hay as it is carried toward the central chute by the chains, and the continued motion of the chains carries the rake-teeth over the end plate 26 into the chute 10, thereby providing means whereby each tooth will rake and deliver its own load into the wagon in a compact form, so that wind cannot possibly interfere with the loading of the hay into the wagon, while at the same time providing an operation whereby choking of the machine is impossible.

Changes in the form, proportion, and the minor details of construction may be resorted to without departing from the principle or sacrificing any of the advantages of this invention.

Having thus described the invention, what is claimed, and desired to be secured by Letters Patent, is—

1. In a hay-loader, the combination of an inclined elevator-chute, an inclined triangular frame supported at one side of said chute, and a triangularly-arranged endless sprocket-chain supported for travel on the triangular frame and carrying rake-teeth, said chain carrying said teeth in contact with the ground at the lower end of the triangular frame and longitudinally through said chute, substantially as set forth.

2. In a hay-loader, a pair of opposite wheeled triangular frames supported at an inclination and having their inner adjacent sides parallel to each other, a central elevator-chute built between the inner parallel sides of the opposite frames, sprocket-wheels mounted at the corners of the triangular frames, and opposite endless triangularly-arranged chains passed around said sprocket-wheels and carrying rake-teeth adapted to travel in contact with the ground and also through said elevator-chute, substantially as set forth.

3. In a hay-loader, the combination with a pair of opposite inclined triangular frames having sprocket-wheels at their corners, a central inclined chute arranged between said frames and having an imperforate bottom, and endless triangularly-arranged chains passed around said sprocket-wheels and carrying a series of spring rake-teeth, said rake-teeth traveling in contact with the ground across the lower end of the triangular frames, and also traveling longitudinally within the chute, substantially as set forth.

4. In a hay-loader, a wheeled axle, opposite inclined triangular frames having sprocket-wheels at their corners, a series of frame-standards connected at their upper ends with said triangular frames and loosely connected at their lower ends with said axle, a central inclined chute built between said triangular frames and having an imperforate bottom, a rectangular end frame fitted to the lower ends of the chute and said triangular frames, slide-bars secured to the lower side bar of said rectangular end frame and provided with slide-feet projected in rear of said end frame, endless triangularly-arranged chains passed around said sprocket-wheels and carrying a series of spring rake-teeth, and upright drive-shafts suitably geared at their lower ends with the axle and carrying at their upper ends drive sprocket-wheels meshing with the outer hypotenuse portions of said chains, substantially as set forth.

In testimony that we claim the foregoing as our own we have hereto affixed our signatures in the presence of two witnesses.

SAML. B. GILLILAND.
WM. R. P. JACKSON.

Witnesses:
H. E. LINN,
GEORGE W. SMITH.